United States Patent
Ryu et al.

(10) Patent No.: US 7,529,059 B2
(45) Date of Patent: *May 5, 2009

(54) METHOD FOR DETERMINING READ/WRITE HEAD POSITION BASED ON PHASE DETECTION OF A SERVO PATTERN

(75) Inventors: Benjamin Geunbae Ryu, Cupertino, CA (US); Ara W. Nazarian, Tustin, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/146,133

(22) Filed: Jun. 25, 2008

(65) Prior Publication Data

US 2008/0253018 A1    Oct. 16, 2008

Related U.S. Application Data (63) Continuation of application No. 11/405,872, filed on Apr. 18, 2006, now Pat. No. 7,405,899.

(60) Provisional application No. 60/780,974, filed on Mar. 10, 2006.

(51) Int. Cl.
     *G11B 5/596* (2006.01)

(52) U.S. Cl. .................... 360/77.08; 360/77.02
(58) Field of Classification Search .................. None
    See application file for complete search history.

(56) References Cited

U.S. PATENT DOCUMENTS

| | | | |
|---|---|---|---|
| 6,366,423 B1* | 4/2002 | Ahn | 360/77.08 |
| 7,027,257 B1* | 4/2006 | Kupferman | 360/77.08 |
| 7,342,734 B1* | 3/2008 | Patapoutian et al. | 360/29 |
| 2003/0197969 A1* | 10/2003 | Szita et al. | 360/77.08 |
| 2004/0252394 A1* | 12/2004 | Hamaguchi et al. | 360/48 |
| 2005/0134987 A1* | 6/2005 | Suzuki et al. | 360/48 |
| 2006/0279873 A1* | 12/2006 | Bandic et al. | 360/78.04 |

* cited by examiner

*Primary Examiner*—Andrew L Sniezek
(74) *Attorney, Agent, or Firm*—Garlick Harrison & Markison (57) ABSTRACT

A method determines RW head radial position relative to tracks within a magnetic data disc. This involves sensing both a S-burst signal and a P-burst signal with the RW head. The S-burst signal and P-burst signal are associated with a two-burst servo pattern on the magnetic disc. The S-burst pattern has a phase that remains constant radially across tracks within the magnetic disc. The P-burst has a second phase that rotates radially across tracks within the magnetic disc. By determining a phase difference between a sensed S-burst signal and P-burst signal, it is possible to determine the RW head radial position relative to the tracks on the magnetic disc.

14 Claims, 14 Drawing Sheets

Prior Art

METHOD FOR DETERMINING READ/WRITE HEAD POSITION BASED ON PHASE DETECTION OF A SERVO PATTERN

CROSS REFERENCE TO RELATED APPLICATION

This application is a continuation of and claims priority to U.S. Patent Application having an application Ser. No. 11/405,872; filed Apr. 18, 2006; which application claims priority to U.S. Provisional Patent Application Ser. No. 60/780,974, filed Mar. 10, 2006; in which both above listed applications are incorporated by reference herein.

TECHNICAL FIELD OF THE INVENTION

The present invention relates generally to determining a Read/Write (RW) head position relative to magnetic media, and more particularly, to determining the RW head position relative to magnetic media based on a phase error associated with a servo pattern.

BACKGROUND OF THE INVENTION

The structure and operation of hard disk drives is generally known. Hard disk drives include, generally, a case, a hard disk having magnetically alterable properties, and a read/write mechanism including Read/Write (RW) heads operable to write data to the hard disk by locally alerting the magnetic properties of the hard disk and to read data from the hard disk by reading local magnetic properties of the hard disk. The hard disk may include multiple platters, each platter being a planar disk.

Figure 1:
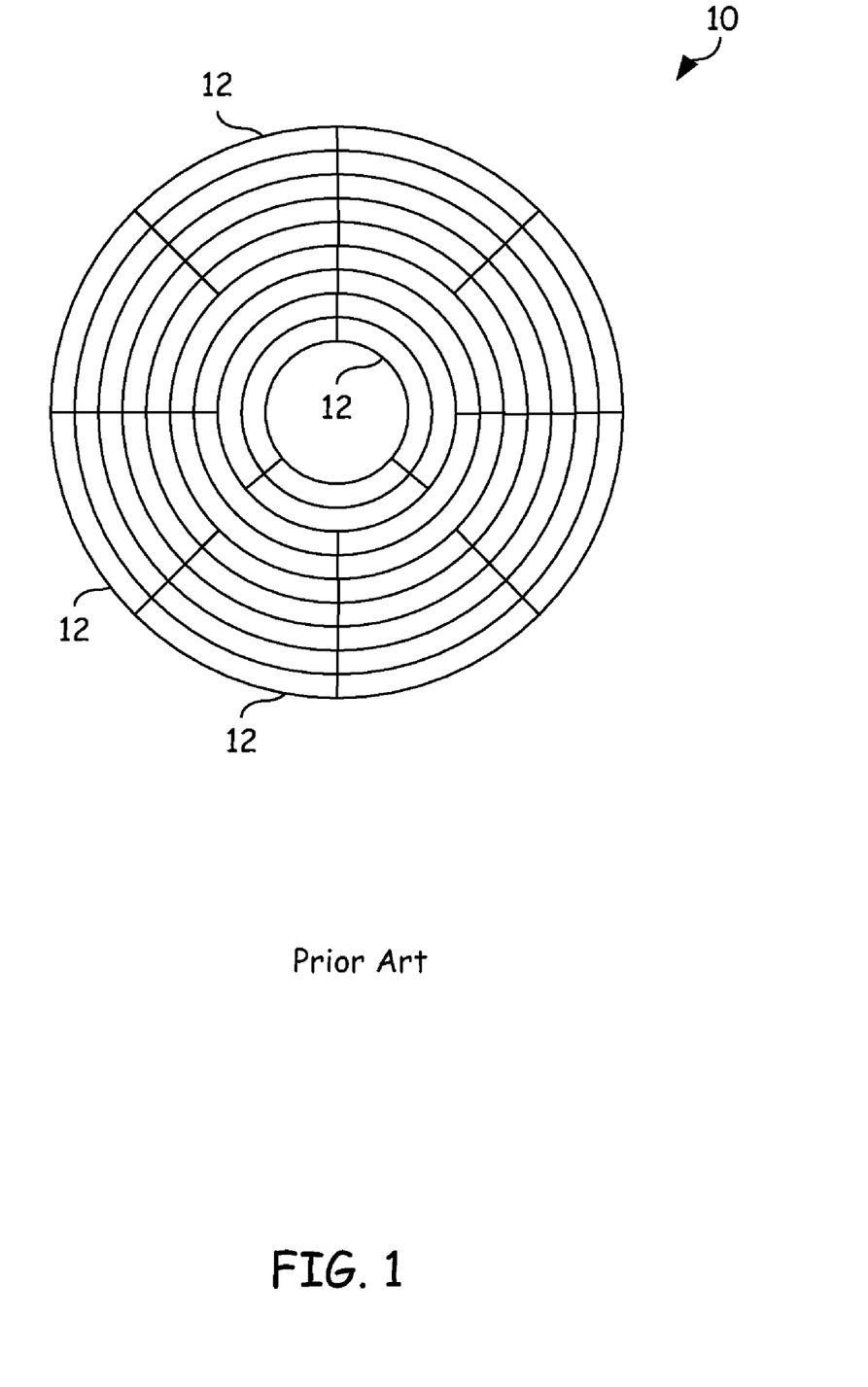
FIG. 1 depicts a known pattern of radially-spaced concentric data tracks within the magnetic media of a disk.

All information stored on the hard disk is recorded in tracks, which are concentric circles organized on the surface of the platters. FIG. 1 depicts a pattern of radially-spaced concentric data tracks 12 within a disk 10. Data stored on the disks may be accessed by moving RW heads radially as driven by a head actuator to the radial location of the track containing the data. To efficiently and quickly access this data, fine control of RW head positioning is required. The track-based organization of data on the hard disk(s) allows for easy access to any part of the disk, which is why hard disk drives are called "random access" storage devices.

Since each track typically holds many thousands of bytes of data, the tracks are further divided into smaller units called sectors. This reduces the amount of space wasted by small files. Each sector holds 512 bytes of user data, plus as many as a few dozen additional bytes used for internal drive control and for error detection and correction.

Typically, these tracks and sectors are created during the low level formatting of the disk. This low level formatting process creates the physical structures (tracks, sectors, control information) on the disk. Normally, this step begins with the hard disk platters containing no information. Newer disks use many complex internal structures, including zoned bit recording to put more sectors on the outer tracks than the inner ones, and embedded servo data to control the head actuator. Newer disks also transparently map out bad sectors. Due to this complexity, all modern hard disks are low-level formatted at the factory for the life of the drive.

Figure 2:
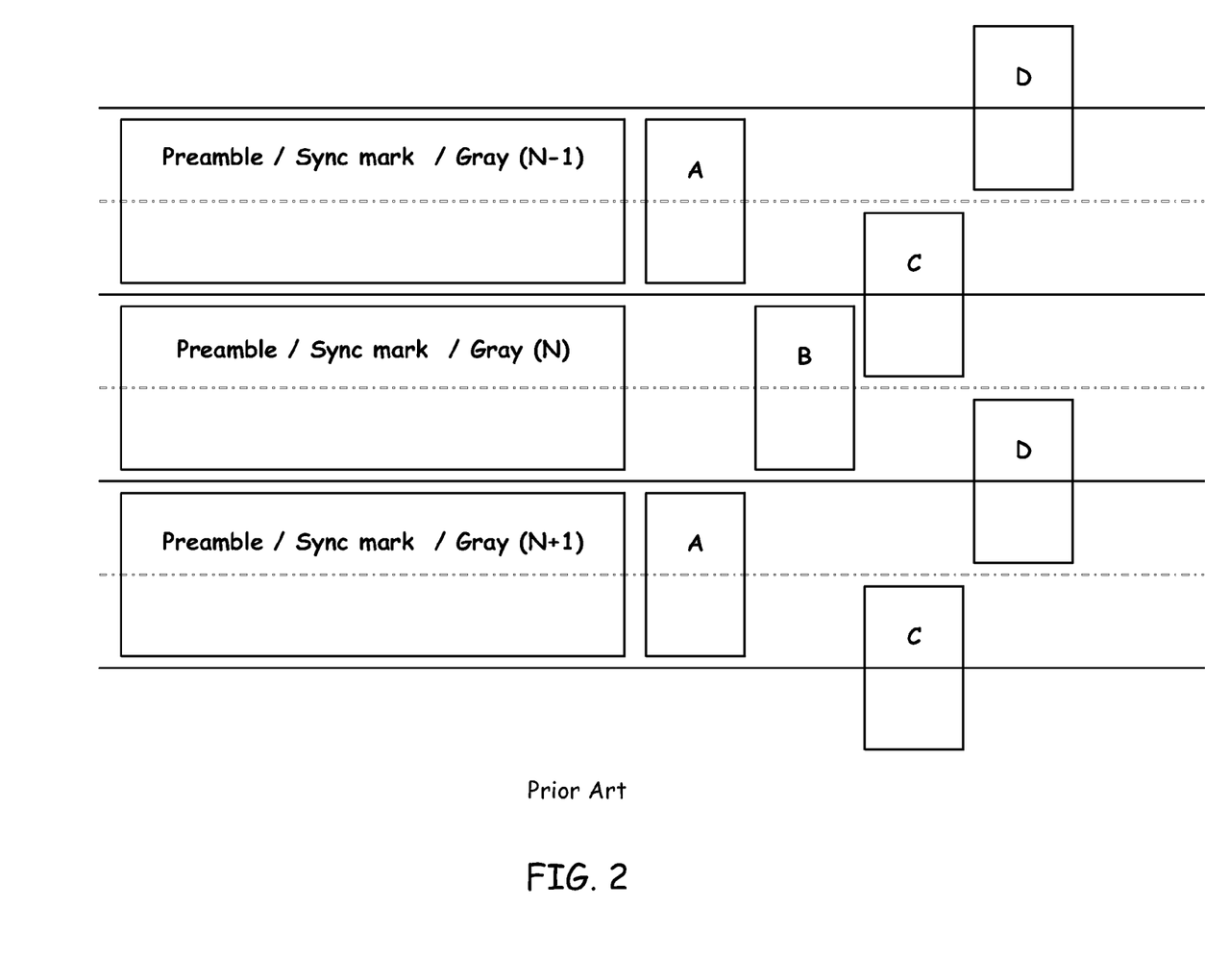
FIG. 2 depicts a known four burst amplitude servo pattern used to determine RW head radial position.
Figure 3A:
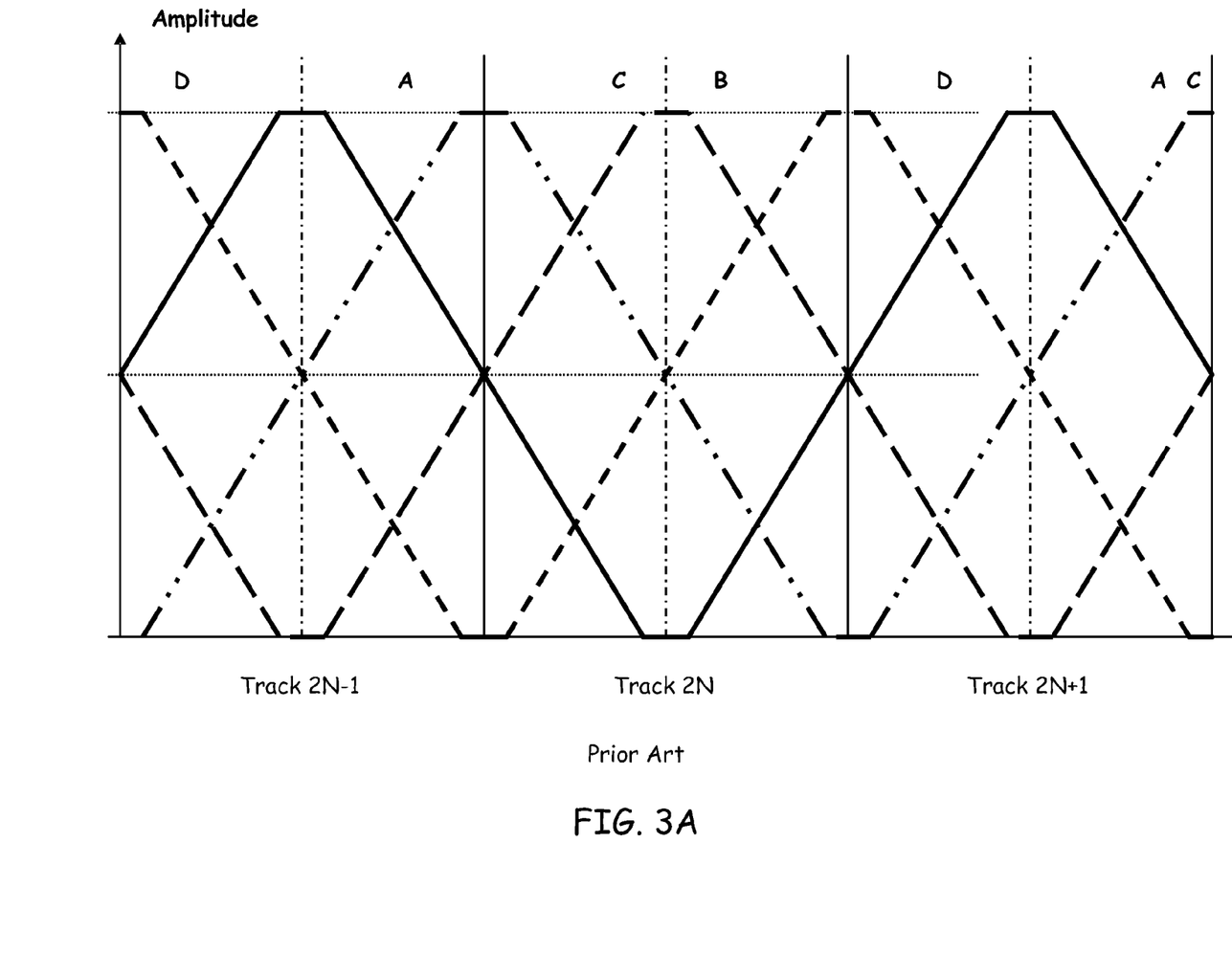
FIG. 3A depicts the sensed amplitude signal of the four bursts of FIG. 2 as a function of RW head radial position.

The ability to store and access increased amounts of data depends on the ability to accurately position the RW head relative to the data tracks. Positioning of the RW head relative to the physical structures is typically based on amplitude information of two (2) or four (4) bursts within a servo pattern. This amplitude information is subject to noise, and environmental changes. A four burst amplitude servo pattern is illustrated in FIG. 2. For example, when the RW right head is located over center of the N−1 track of FIG. 2 a maximum "A" signal amplitude, minimum "B" signal amplitude, and "C" and "D" signal amplitudes that are approximately equal are sensed. The amplitude of bursts "A", and "B", must allow the disk controller to determine whether the head is over an even or odd track while the "C" and "D" signal amplitudes allow the controller to determine the distance how well centered the head is relative to the track. The amplitudes of signals "A", "B", "C", and "D", associated with varying track position is shown in FIG. 3A.

Figure 3B:
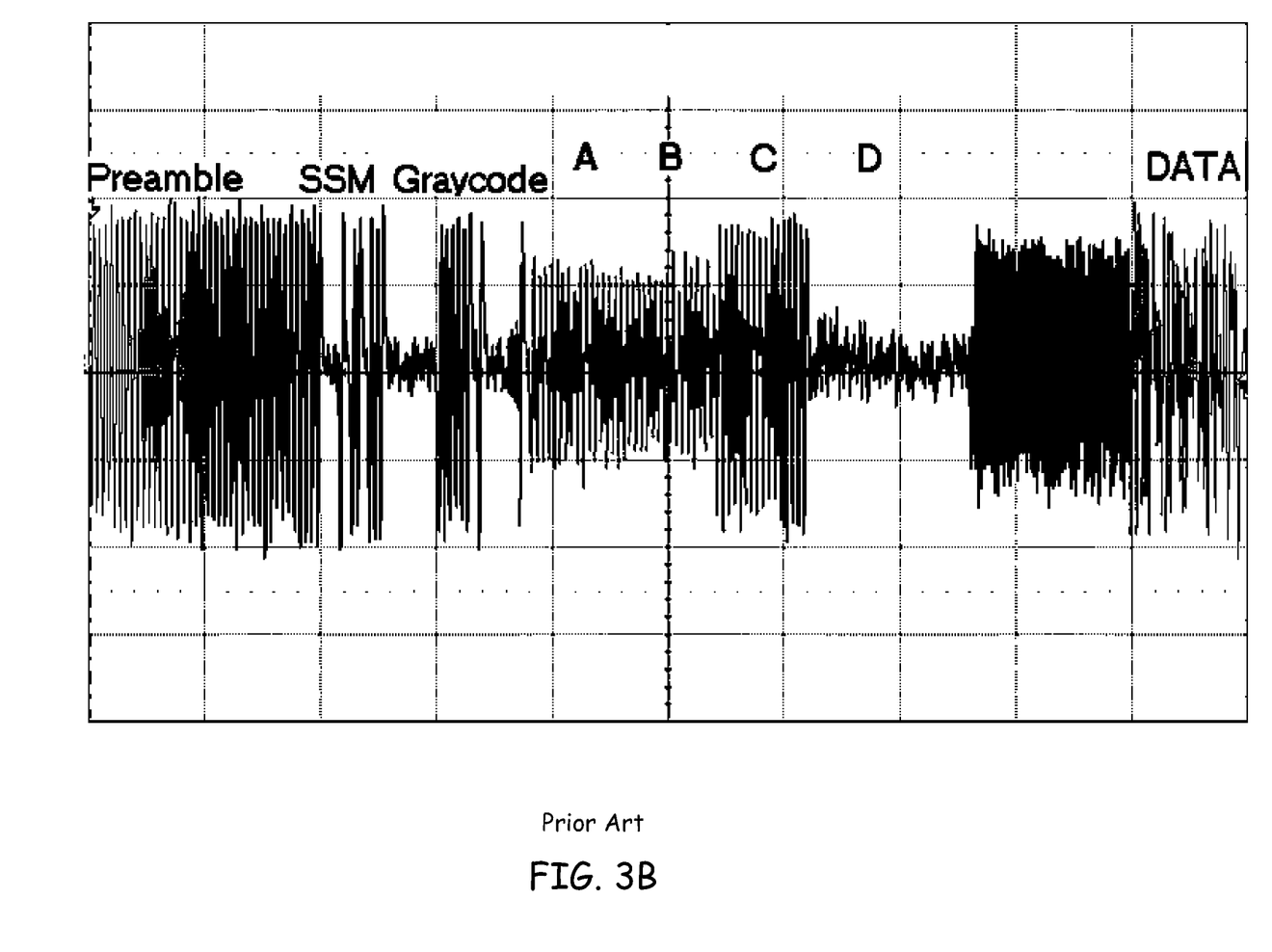
FIG. 3B depicts a sensed servo signal as detected on an individual track.

In FIG. 3B a servo signal is shown on an individual track. As can be seen the servo signal contains a preamble sync mark, and gray code information prior to the a four bursts, this case the amplitudes of the "A" and "B" signal bursts are approximately equal. The "C" burst is at a maximum while the "D" burst is at a minimum. Returning to FIG. 2 this would correspond to the RW head being located midway between track N and N−1 where the "A" and "B" amplitudes are approximately equal. The "C" amplitude signal is at a maximum while the "D" amplitude signal is at a minimum. The data portion of the servo signal follows the four bursts.

This four burst pattern does not allow all the disk space to be effectively used. This servo pattern requires unused media leaves less user data space on the media for storage. To realize additional storage availability, require higher data density is required which may result in a poor quality and production yield.

Further limitations and disadvantages of conventional and traditional RW head positioning processes and related functionality will become apparent to one of ordinary skill in the art through comparison with the present invention described herein.

SUMMARY OF THE INVENTION

The present invention is directed to apparatus and methods of operation that are further described in the following Brief Description of the Drawings, the Detailed Description of the Embodiments of the Invention, and the Claims. Other features and advantages of the present invention will become apparent from the following detailed description of the embodiments of the invention made with reference to the accompanying drawings.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGs., like numerals being used to refer to like and corresponding parts of the various drawings.

Embodiments of the present invention provide a system or method operable to locate and position a read-write (RW) head in order to more efficiently utilize magnetic media within a hard disk drive that substantially addresses the above-identified needs. A first embodiment of the present invention provides a method to determine RW head position relative to a track within the magnetic media. This involves sensing a two burst servo pattern. A phase difference between the two bursts is determined. This hard disk drive contains a disk controller that is able to accurately compute the RW head position and position the RW head of the hard disk drive based on phase differences between first and second sensed burst signals. By accurately positioning the RW head, the physical structures (i.e. tracks and sectors) and data therein are accessed more efficiently.

The disk controller locates and positions the RW head based on a two burst servo pattern. The disk controller locates and positions the RW head based on phase difference sensed between the two bursts. (i.e. the S-burst and the P-burst)

By positioning the RW head using phase information, the disk controller may provide a finer control of the position (i.e. location) of the RW head relative to the magnetic media. This type of positioning reduces or eliminates position errors associated with prior processes. The reduction or elimination of position errors results in a higher quality definition of physical structures (i.e. sectors and tracks) within the hard disk that may ultimately result in both lower product cost and high product yield.

Figure 4:
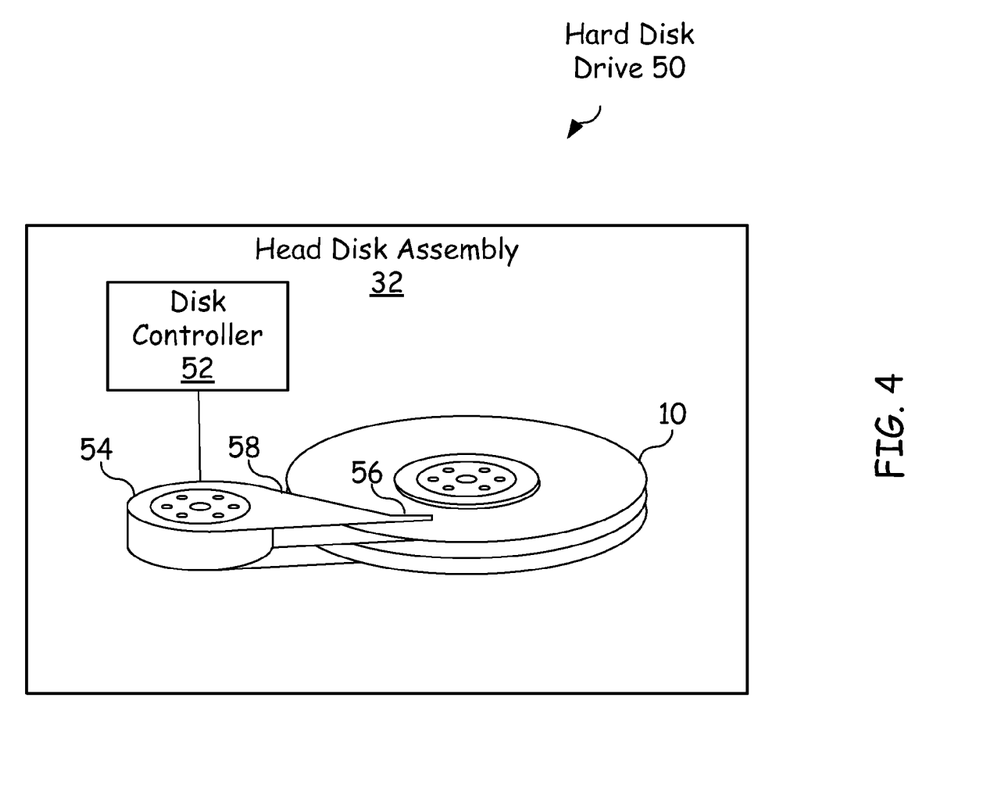
FIG. 4 depicts a hard disk drive that includes control circuitry operable to determine RW head radial position in accordance with an embodiment of the present invention.

FIG. 4 is a system diagram of hard disk drive 50. Hard disk drive 50 includes a head disk assembly 32, Disk controller 52, actuator 54, and RW head 56 located at the distal end of arm 58. Disk controller 52 may determine the first magnetic reference pattern (servo pattern) to be written onto disk 10. Disk controller 52 may function as a disk controller operable to direct the positioning of a RW head 56 over disk 10 with the use of precision positioning information such as phase difference information as present in this application.

Figure 5:
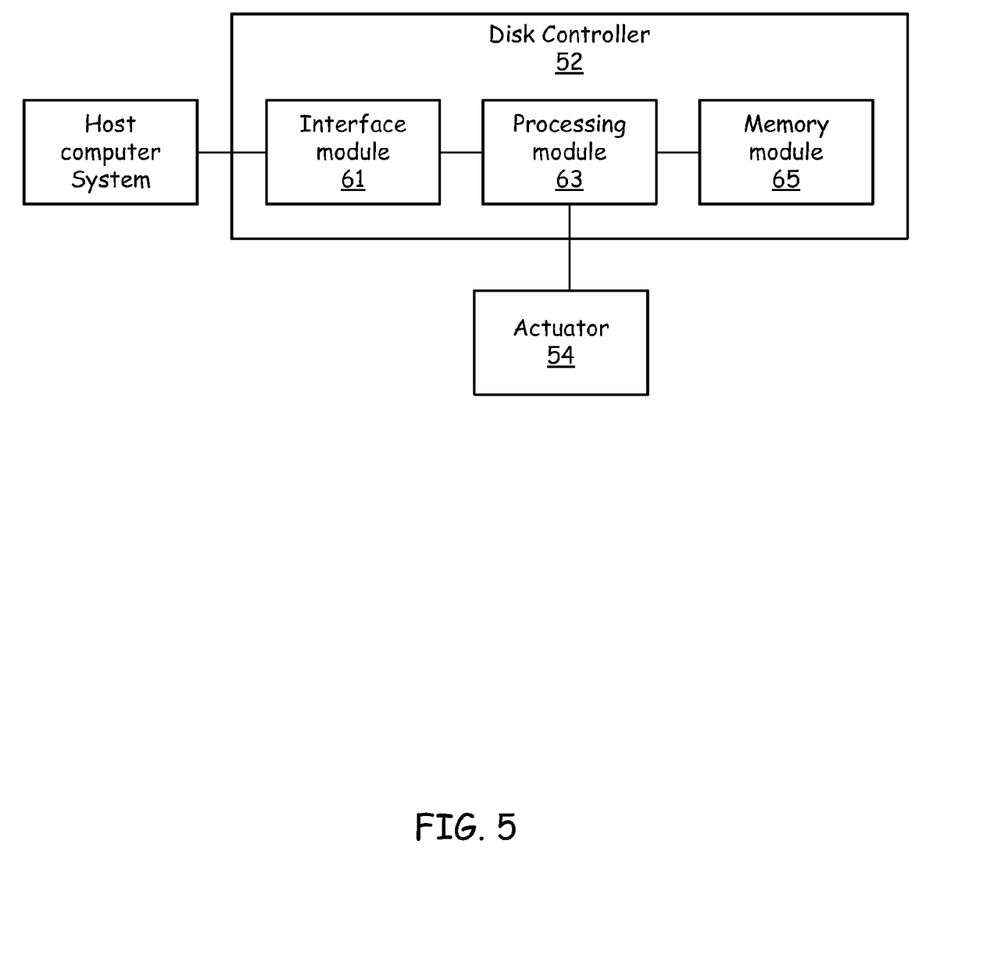
FIG. 5 is a functional block diagram of a disk controller operable to determine RW head radial position in accordance with an embodiment of the present invention.

FIG. 5 depicts disk controller 52 as including an interface module 61, processing module 63 and memory module 65. Disk Controller 52, which may be implemented as an integrated circuit or series of discrete components, may interface with a host computer system and direct the operation of the other internal components within hard disk drive 50.

Processing module 63 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. Memory module 65 may take the form of a single memory device or a plurality of memory devices. Such a memory device may be a read-only memory, random access memory, volatile memory, non-volatile memory, static memory, dynamic memory, flash memory, cache memory, and/or any device that stores digital information. Note that when the Disk controller 52 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. Processing module 63 stores and executes operational instructions corresponding to at least some of the steps and/or functions illustrated with reference to FIGS. 12 and 13.

Figure 6:
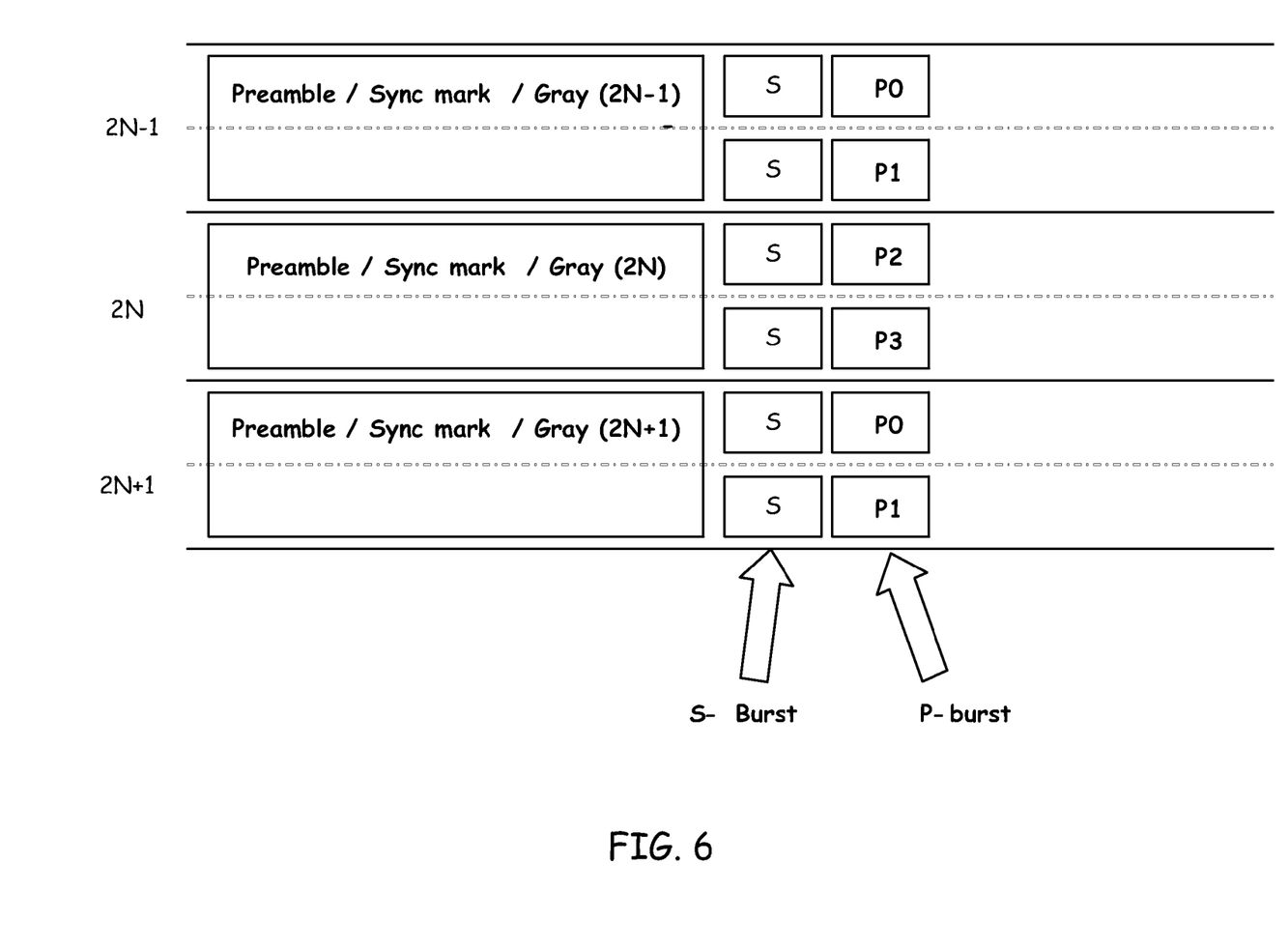
FIG. 6 depicts a two burst servo pattern within three adjacent tracks that may be used to determine RW head radial position in accordance with an embodiment of the present invention.

FIG. 6 depicts a two burst servo pattern within three adjacent tracks that may be used to determine RW head radial position in accordance with an embodiment of the present invention. Here tracks 2N−1, 2N and 2N+1 are depicted within a disk. This servo wedge contains two bursts as opposed to the traditional four. These bursts are a S-burst and a P-burst. The S-bursts remain in phase across the tracks, 2N−1, 2N and 2N+1. However the P-bursts and related P-bursts signal changes phase depending on the RW head position relative to the centerline of the track. This due to P-bursts P0, P1, P2 and P3 being phase shifted relative to one another.

Figure 7:
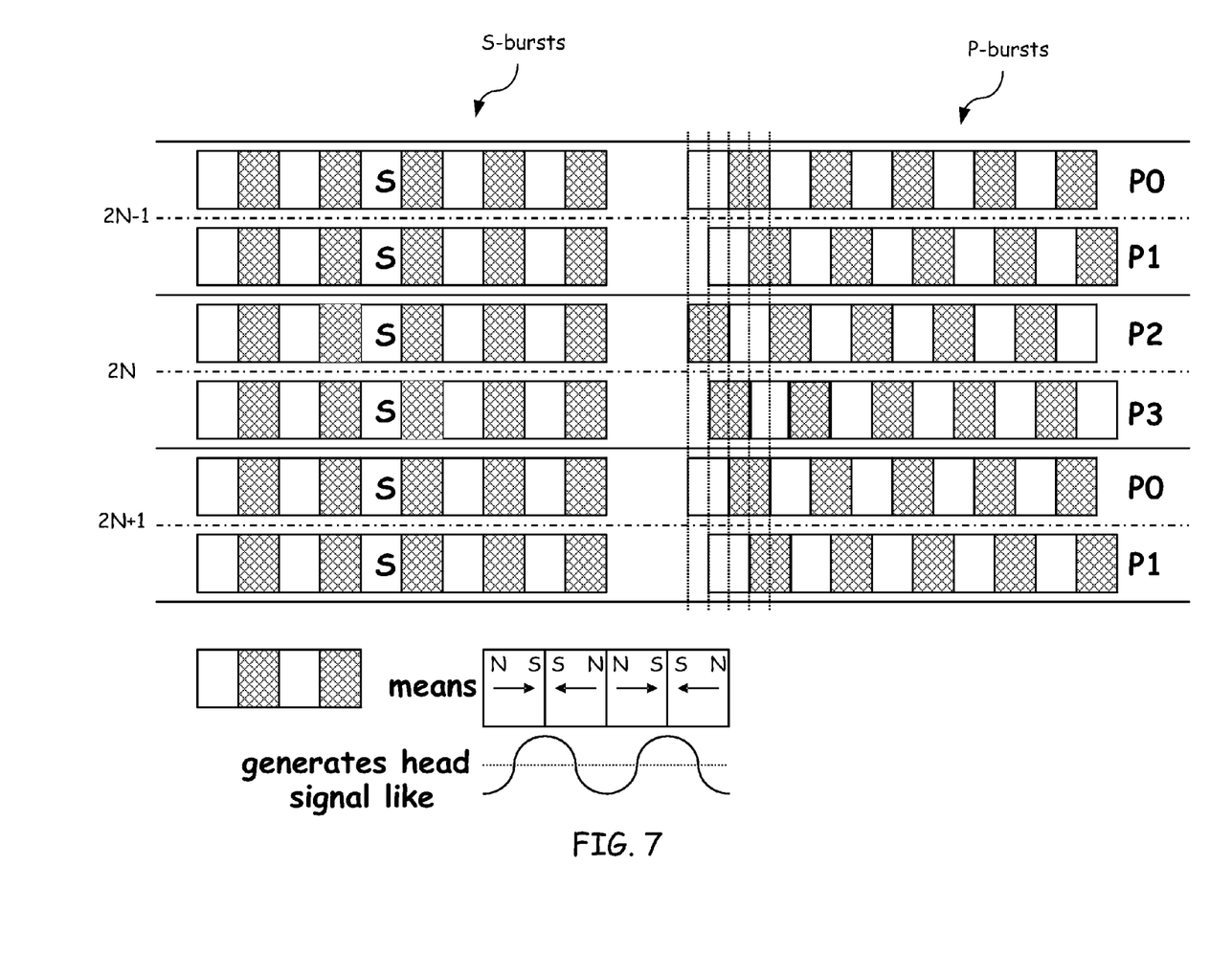
FIG. 7 depicts in greater detail the two burst servo pattern of FIG. 6 within three adjacent tracks that may be used to determine RW head radial position in accordance with an embodiment of the present invention.
Figure 8:
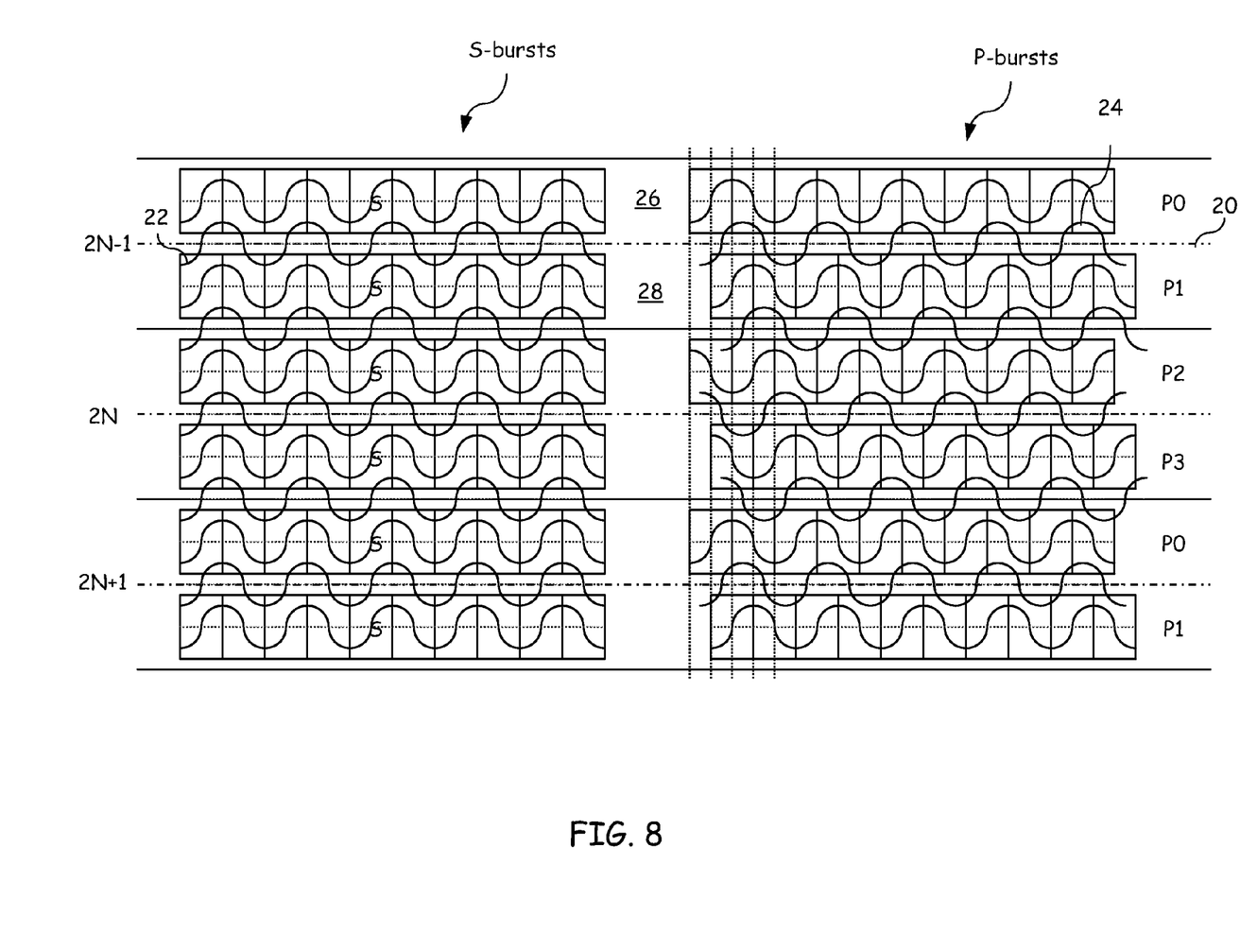
FIG. 8 depicts the phase information of the two burst servo pattern depicted in FIGS. 6 and 10 within three adjacent tracks that may be used to determine RW head radial position in accordance with an embodiment of the present invention.

FIG. 7 depicts in greater detail the two burst servo pattern of FIG. 6 within three adjacent tracks that may be used to determine RW head radial position in accordance with an embodiment of the present invention. While FIG. 8 depicts the phase information of the two burst servo pattern depicted in FIGS. 9 and 10 within the three adjacent tracks. In FIG. 7, the S-bursts remain in phase across the tracks while the P-bursts are shifted 90° between each half (½) track of radial displacement. Thus the sensed P-burst signal 24 as shown in FIG. 8 changes depending on the RW heads' radial position with respect to the tracks. For example, a RW head of a disk drive is located over centerline 20 of the 2N−1 track. There is no phase difference between the upper half track 26 and lower half track 28 within the S-burst. Therefore, no phase change is observed as the head moves radically with respect to centerline 20. However P-burst, P0, is 90° out of phase with respect to P-burst, P1. This pattern continues with P-bursts P2 and P3. Thus when the RW head is located along centerline 20 of track 2N−1 the P-burst signal 24 observed is phase shifted to exhibit a phase between P-bursts P0 and P1. As the RW head shifts towards the upper half track 26 the P-burst signal will approach the expected P0 signal. As the RW head shifts radially downward the signal will approach the P1 burst.

Figure 9:
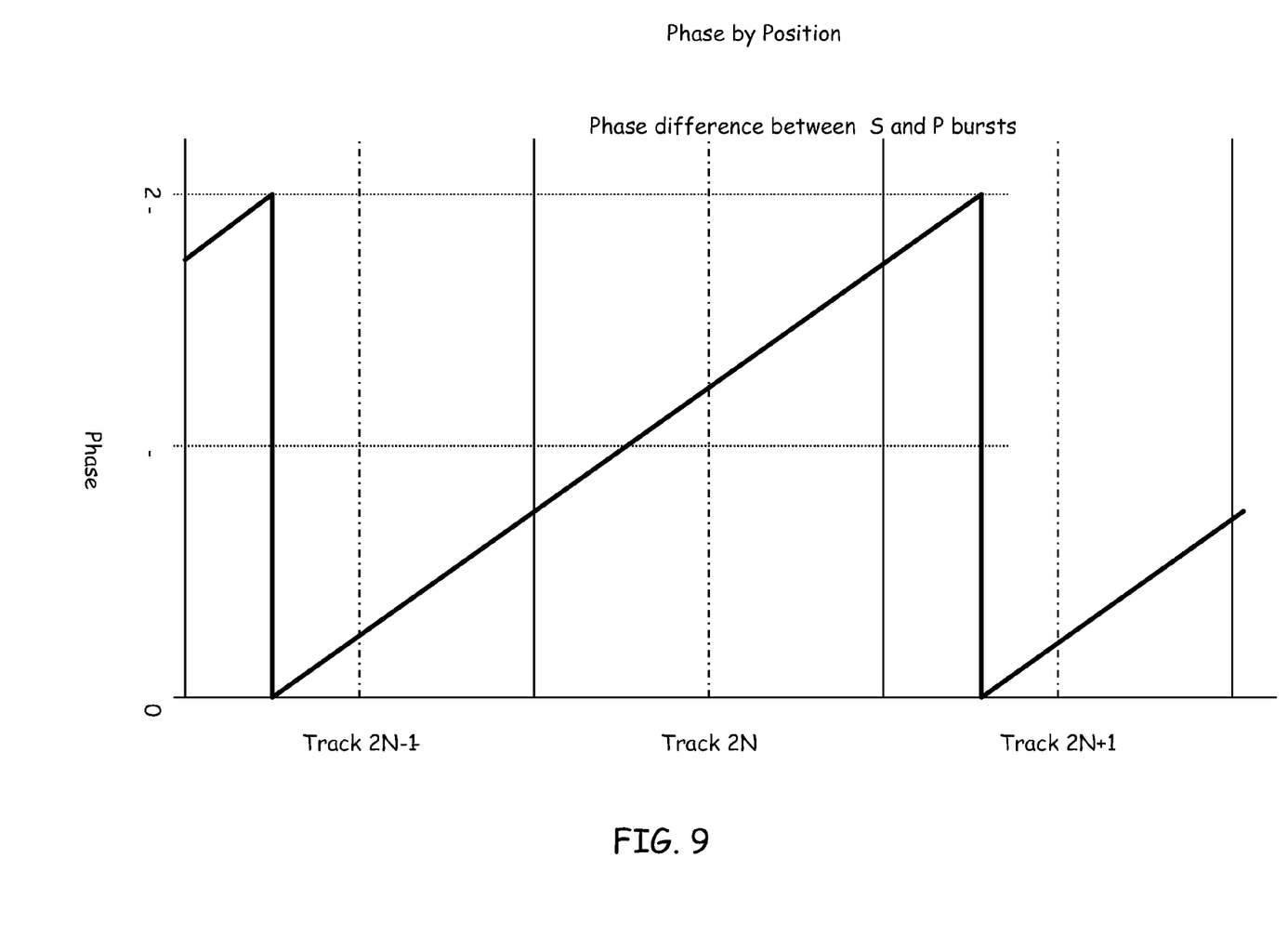
FIG. 9 depicts a linearized phase difference as a function of RW head radial position in accordance with an embodiment of the present invention.

FIG. 9 shows the phase difference between the S and P-burst measured by the RW head as a function of radial position with respect tracks 2N−1, 2N, and 2N+1. The phase difference between the P-burst signals from bursts P0, P1, P2, and P3 allow the phase of the sensed P-burst to rotate with respect to the sensed S-burst as the RW head moves radially. Thus by determining the phase difference between the sensed S-burst signal 22 and the P-burst signal 24, one may realize a more accurate determination of the position of the RW head relative to individual tracks. This phase difference is less susceptible to noise and other environmental factors when compared to the amplitude difference.

Figure 10:
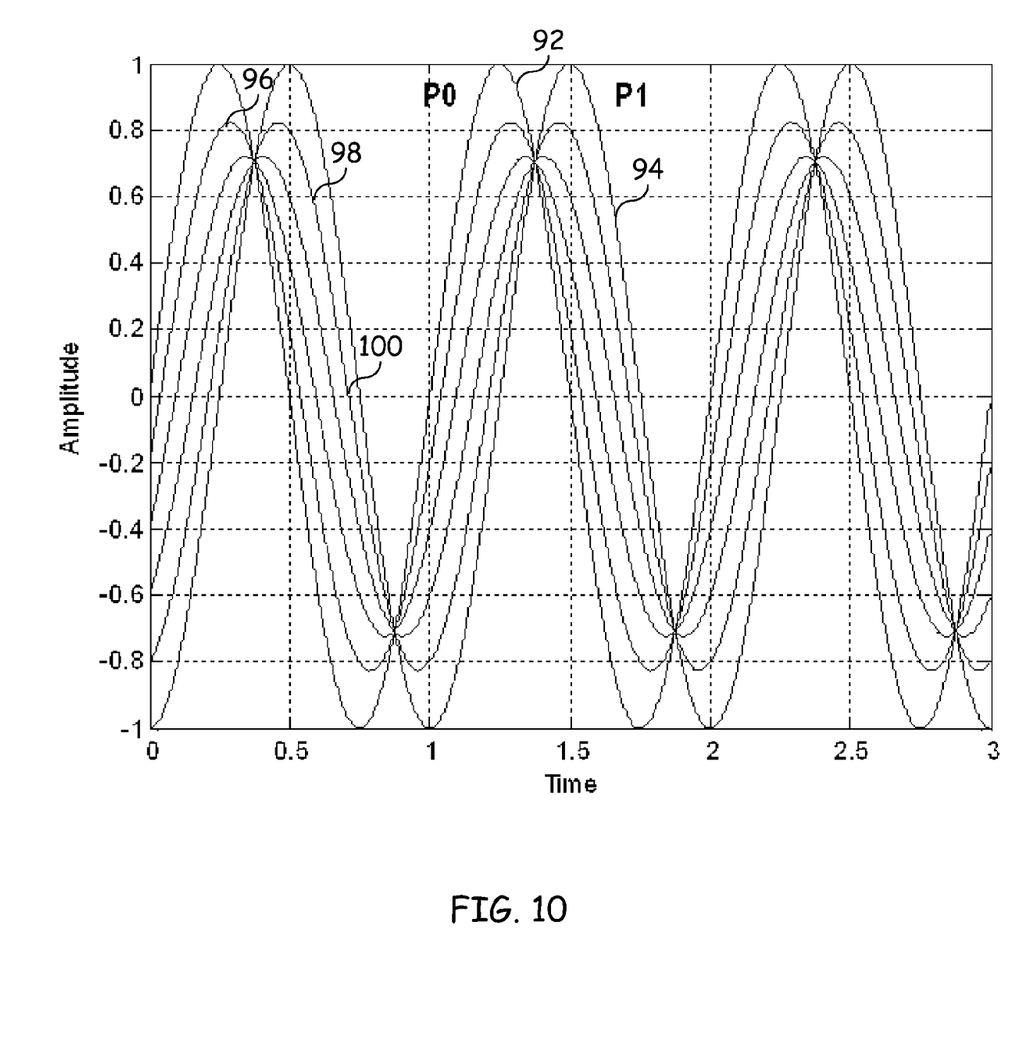
FIG. 10 depicts how P-burst signals detected from adjacent P-bursts may combine to produce a phase shifted P-burst signal in accordance with an embodiment of the present invention.

FIG. 10 depicts how P-burst signals detected from adjacent P-bursts may combine to produce a phase shifted P-burst signal in accordance with an embodiment of the present invention. This simulation provides the expected sensed P-burst signal as the RW head position varies between P0 and P1 within track 2N−1. As shown here peak amplitudes of the P-burst signal result when the RW head is aligned along the center of an individual P-burst. Such as the P-burst signal 92 associated with P0 and P-burst signal 94 associated with P1. Signals 96, 98 and 100 are a phase shifted and have a reduced amplitude signal. This is caused by sensing a combined signal from P-bursts P0 and P1. Thus in this case the phase signal provides a more accurate representation as the RW head varies in position radially.

Figure 11:
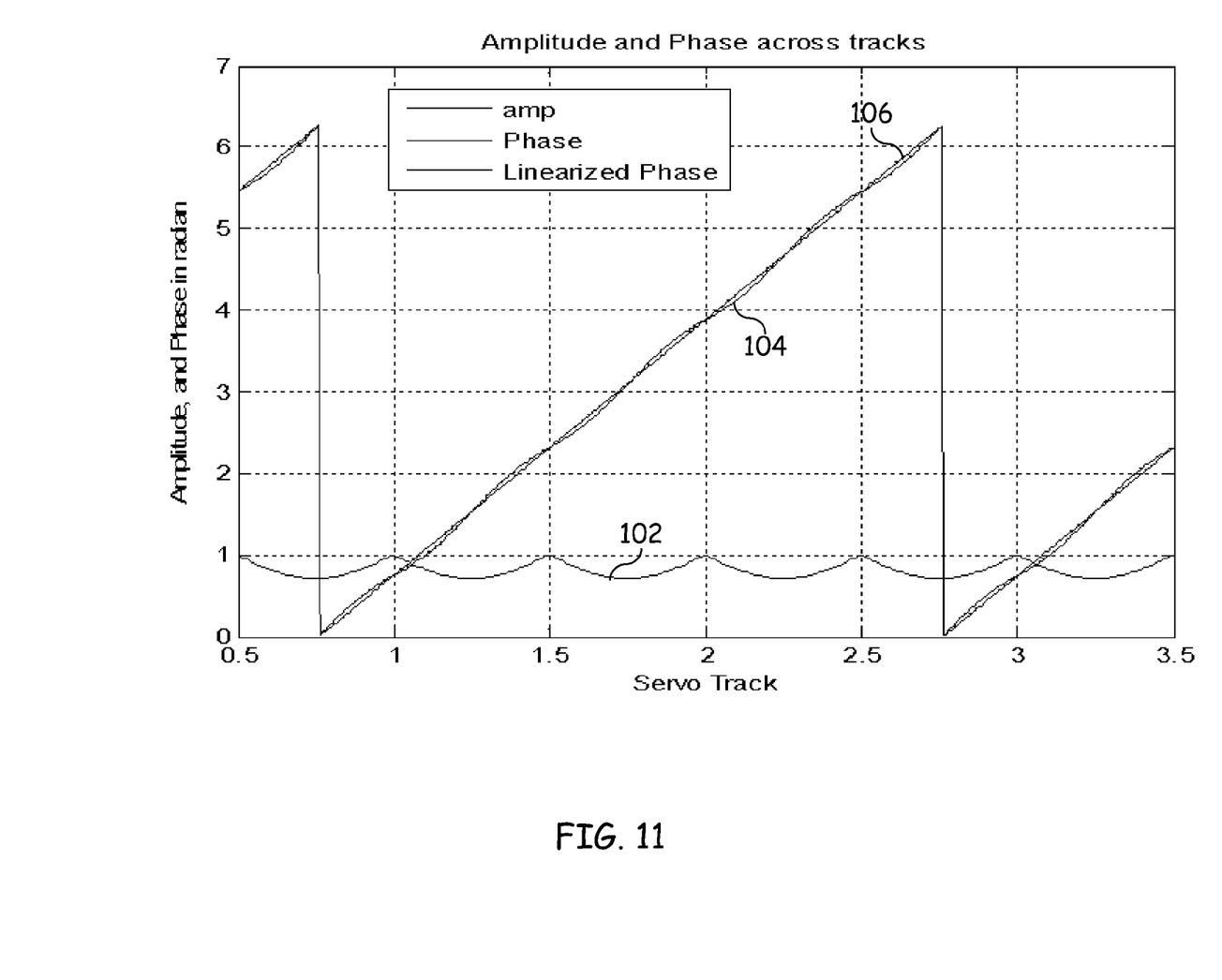
FIG. 11 presents a simulation of phase difference and sensed amplitude as a function of RW head radial position in accordance with an embodiment of the present invention.

FIG. 11 presents a simulation of phase difference and sensed amplitude as a function of RW head radial position in accordance with an embodiment of the present invention. Simulated amplitude signal 102, phase signal 104 and linearized phase signal 106 are shown. Amplitude signal 102 is shown to vary as the read/write head position varies radically over the various servo tracks. The phase of the sensed P-burst signal as the RW head varies over servo track exhibits a small non linearity which can be compensated for with knowledge of the amplitude signal 104. The results in a linearized phase signal across various servo tracks. Thus a two burst servo wedge may reduce the overall size of the servo pattern which results in a potential increase in drive capacity.

One may also observe from the phase linearization process illustrated in FIG. 11 that phase information is more accurate and much less subject to noise and environment factors than amplitude information. By using phase information associated with the S-bursts and P-bursts instead of amplitudes embodiments of the present invention may provide a more robust means of tracking RW head position relative to individual tracks. This may additionally result in improved tracking quality. The S-burst when used as a reference phase helps to account for phase change between wedges due to the spin speed variation, disc shift, servo patterning accuracy, and other inaccuracies associated which may be present.

Figure 12:
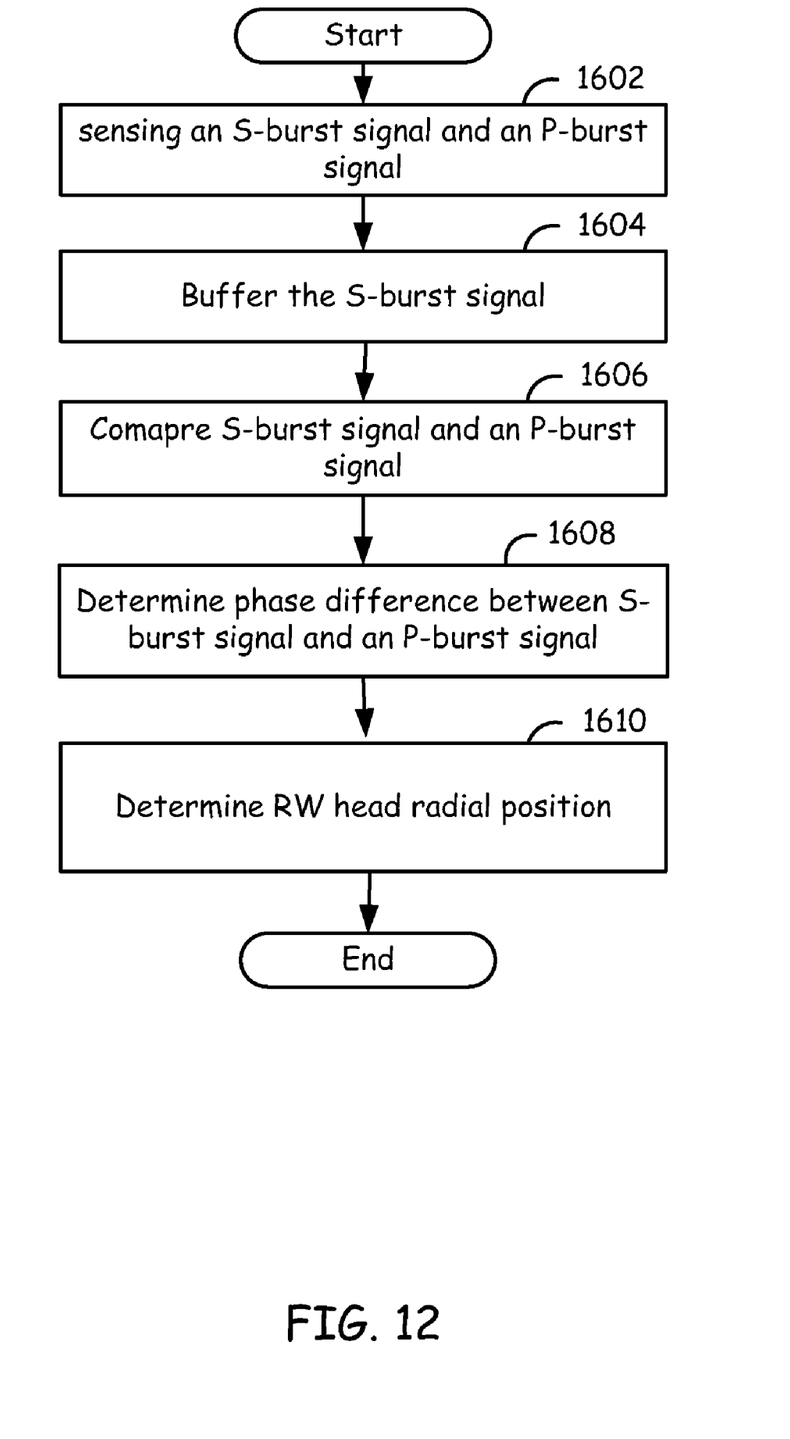
FIG. 12 provides a logic flow diagram operable to determine RW head radial position relative to a track within a magnetic disk in accordance with one embodiment of the present invention.
Figure 13:
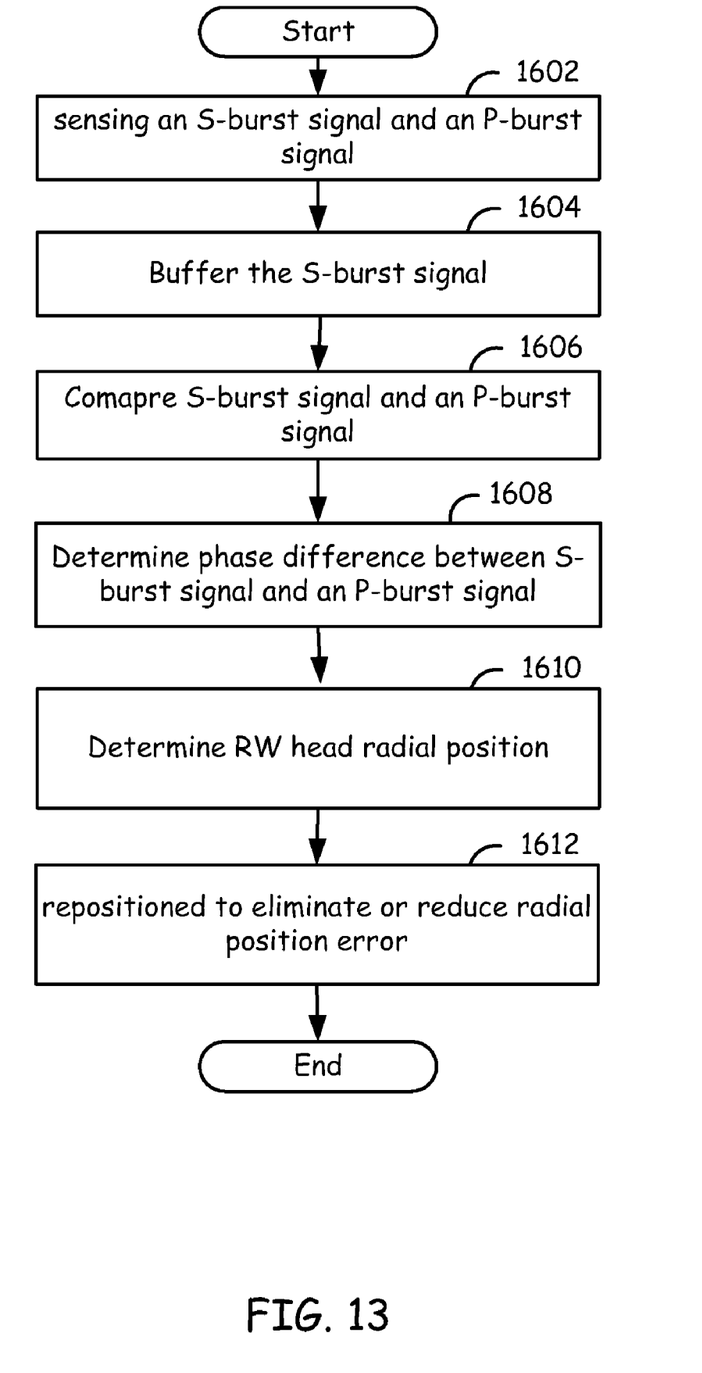
FIG. 13 provides a logic flow diagram operable to control RW head radial position relative to a track within a magnetic disk in accordance with one embodiment of the present invention.

FIG. 12 provides a logic flow diagram operable to determine RW head radial position relative to a track within a magnetic disk in accordance with one embodiment of the present invention. This process involves first sensing a S-burst signal and a P-burst signal with the RW head in step 1602, the S-burst signal and the P-burst signal associated with a servo pattern on the magnetic disk. The servo pattern includes both a S-burst pattern having a first phase. As discussed with reference to FIGS. 10, 11 and 12, the S-burst pattern phase remains constant radially across tracks within the magnetic disk. The P-burst pattern has a second phase wherein the P-burst pattern phase rotates radially across tracks within the magnetic disk as seen previously in FIGS. 11 and 12. The sensed S-burst signal can be buffered in step 1604 for comparison to the sensed P-burst signal in step 1606. This comparison results in a phase difference between the sensed S-burst signal and the P-burst signal in step 1608. As shown in FIGS. 12 and 13, the sensed phase difference varies with RW head radial position. As shown in these embodiments the P-burst phase rotates ¼ cycle (90°) for each half track of radial displacement. However, the amount of rotation may be varied to achieve increased linearity and resolution (i.e. P-burst phase rotates ⅛ cycle (45°) for each half track of radial displacement). The RW head radial position may then be determined in step 1610 using phase difference information or linearized phase difference information such as that presented in FIG. 13.

FIG. 13 provides a second logic flow diagram operable to control RW head radial position relative to a track within a magnetic disk in accordance with one embodiment of the present invention. With the track number information from the gray coded information and the track error position as determined based on the phase difference between the S-bursts and P-bursts, the disk controller may direct the RW head to be repositioned to eliminate or reduce radial position error in step 1612 of FIG. 13. Such fine tuned control of the RW head position and decreased overhead requirements may result in increased storage within the disk and the ability to more accurately and efficiently access information from disk.

Embodiments of the present invention provide the ability to accurately position the read-write head relative to the magnetic media using only two bursts per servo wedge. This reduces the space associated with the servo pattern overhead and increases the overall memory or drive capacity. Additionally, phase information is less subjected to noise and other environmental factors when compared to amplitude information. Therefore, by using phase information of the bursts instead of the amplitudes, the Servo system provides a more robust and improved tracking quality.

When the embodiments of the present invention use an "S" burst for the reference phase, the system is more robust when examining the phase change between wedge to wedge is due to spin speed variation, disk shift, Servo pattern writing accuracy and other factors. The phase cycle covers two Servo tracks, the one bit ambiguity on cylinder number where within a Gray code can be compensated with phase information. Phase burst changes to phase by one quarter cycle every half Servo track. Thus, it is easy to accurately determine the radial position of the RW head.

In summary, embodiments of the present invention provide a method operable to determine RW head radial position relative to tracks within a magnetic data disc. This involves sensing both a S-burst signal and a P-burst signal with the RW head. The S-burst signal and P-burst signal are associated with a two-burst servo pattern on the magnetic disc. The S-burst pattern has a phase that remains constant radially across tracks within the magnetic disc. The P-burst has a second phase that rotates radially across tracks within the magnetic disc. By determining a phase difference between a sensed S-burst signal and P-burst signal, it is possible to determine the RW head radial position relative to the tracks on the magnetic disc. Track information may be determined by other means such as gray coded information within SSMs.

In other embodiments this phase difference may be used to not only determine the position but also provide the ability to reposition the RW head for improved reading of data within a track. In one embodiment the P-burst phase rotates one-quarter cycle or 90° for each half track of radial displacement. However, this amount of phase rotation may be increased or decreased in order to provide improved resolution of the radial disc placement. For example, the P-burst phase may rotate only one-eighth of a cycle or 45 degrees for each half track of radial displacement. However, this amount of rotation should not be limited to these two specific examples as other amounts of rotation are possible.

In yet another embodiment a hard disk drive having a hard disk controller at least one magnetic disc may use this two-burst servo pattern in order to determine the radial position of the RW head within the disk. With this information, the disk controller may then direct how the read-write head is to be radially repositioned.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Although the present invention is described in detail, it should be understood that various changes, substitutions, and alterations can be made hereto without departing from the spirit and scope of the invention as described by the appended claims.

What is claimed is:

1. A method comprising:
   sensing a first burst servo pattern on a portion of a track of a rotatable medium used for data storage, wherein the sensed first burst servo pattern is one of a plurality of first burst servo patterns that are disposed radially across the rotatable medium on each half track of each track of the rotatable medium and in which all first burst servo patterns have a same phase relationship;
   sensing a second burst servo pattern on the portion of the track of the rotatable medium following the sensed first burst servo pattern, wherein the sensed second burst servo pattern is one of a plurality of second burst servo patterns in which a corresponding second burst servo pattern follows each first burst servo pattern on each half track and in which all second burst servo patterns across two adjacent tracks have different phases;
   determining a phase difference between the sensed first burst servo pattern and the sensed second burst servo pattern; and
   locating head radial position based on the phase difference between the sensed first burst servo pattern and the sensed second burst servo pattern.

2. The method of claim 1, wherein the first burst servo pattern is a S-burst pattern and the second burst servo pattern is a P-burst pattern.

3. The method of claim 2, wherein a servo pattern for the rotatable medium comprises two bursts per servo wedge for each half track, in which the two bursts are obtained from the S-burst pattern and the P-burst pattern.

4. The method of claim 1, wherein the second burst servo pattern has a phase difference of 90° for each half track of radial displacement.

5. The method of claim 1, wherein the second burst servo pattern has a phase difference of 45° for each half track of radial displacement.

6. The method of claim 1 wherein the rotatable medium is a magnetic disk.

7. The method of claim 1, farther comprising repositioning radially a sensing head after locating head radial position.

8. An apparatus comprising:
   a sensing head;
   a disk controller to control positioning of the sensing head;
   a rotatable medium under control of the disk controller in which a first burst servo pattern is disposed radially across the rotatable medium on each half track of each track of the rotatable medium, wherein all first burst servo patterns across tracks of the rotatable medium have a same phase relationship, and in which a corresponding second burst servo pattern is disposed following each first burst servo pattern on each half track of the medium, wherein all second burst servo patterns across two adjacent tracks have different phases, so that a phase difference between a sensed first burst servo pattern and a corresponding sensed second burst servo pattern on a particular half track identifies radial position of the sensing head based on the phase difference between the sensed first burst servo pattern and the sensed second burst servo pattern.

9. The apparatus of claim 8, wherein the first burst servo pattern is a S-burst pattern and the second burst servo pattern is a P-burst pattern.

10. The apparatus of claim 9, wherein a servo pattern for the rotatable medium comprises two bursts per servo wedge for each half track, in which the two bursts are obtained from the S-burst pattern and the P-burst pattern.

11. The apparatus of claim 8, wherein the second burst servo pattern has a phase difference of 90° for each half track of radial displacement.

12. The apparatus of claim 8, wherein the second burst servo pattern has a phase difference of 45° for each half track of radial displacement.

13. The apparatus of claim 8 wherein the rotatable medium is a magnetic disk.

14. The apparatus of claim 8, wherein the disk controller to reposition the sensing head after locating head radial position.

* * * * *

UNITED STATES PATENT AND TRADEMARK OFFICE
CERTIFICATE OF CORRECTION

PATENT NO.         : 7,529,059 B2  
APPLICATION NO.  : 12/146133  
DATED              : May 5, 2009  
INVENTOR(S)       : Benjamin Geunbae Ryu et al.

It is certified that error appears in the above-identified patent and that said Letters Patent is hereby corrected as shown below:

Column 8, line 22, in Claim 7: replace "farther" with --further--.

Signed and Sealed this

Fourteenth Day of July, 2009

JOHN DOLL  
*Acting Director of the United States Patent and Trademark Office*